United States Patent [19]
Wada et al.

[11] Patent Number: 5,689,503
[45] Date of Patent: Nov. 18, 1997

[54] RANDOM ACCESS SYSTEM OF A MOBILE COMMUNICATION SYSTEM

[75] Inventors: Azusa Wada; Akihiro Maebara; Ichiro Okajima; Katsumi Kobayashi; Noriko Uchida; Shinji Uebayashi; Narumi Umeda, all of Yokohama, Japan

[73] Assignee: NTT Mobile Communications Network Inc., Japan

[21] Appl. No.: 553,351

[22] PCT Filed: Jul. 14, 1995

[86] PCT No.: PCT/JP95/01411

§ 371 Date: Nov. 16, 1995

§ 102(e) Date: Nov. 16, 1995

[87] PCT Pub. No.: WO96/02985

PCT Pub. Date: Feb. 1, 1996

[30] Foreign Application Priority Data

Jul. 15, 1994 [JP] Japan .................. 94 164104

[51] Int. Cl.⁶ .................................... H04B 7/212
[52] U.S. Cl. .................... 370/337; 370/348; 370/459; 370/443
[58] Field of Search .................. 370/459, 458, 370/444, 443, 442, 348, 347, 345, 337, 336, 322, 326, 439, 438, 915

[56] References Cited

U.S. PATENT DOCUMENTS

| 5,515,379 | 5/1996 | Crisler et al. | 370/95.3 |
| 5,603,081 | 2/1997 | Raith | 455/33.1 |

FOREIGN PATENT DOCUMENTS

| 2060428 | 8/1992 | Canada . |
| 4-320120 | 11/1992 | Japan . |
| 5-336061 | 12/1993 | Japan . |
| 6-53875 | 2/1994 | Japan . |
| 6-112873 | 4/1994 | Japan . |

Primary Examiner—Douglas W. Olms
Assistant Examiner—Matthew C. Phillips
Attorney, Agent, or Firm—Scully, Scott, Murphy and Presser

[57] ABSTRACT

When data is transferred by using a plurality of time slots, the transferring period is shortened by adopting priority to assign the required number of slots. The base station BS which accepted packet P1 generates a "BUSY" signal and an echo at the final portion of the first time slot TS which begins at time t4. The base station BS, recognizing that there is a packet following the packet P1, generates a "RESERVED" signal at the final portion of the time slot TS which begins at time t5. The mobile station MS-A learns that the first time slot is assigned by recognizing the "BUSY" signal and the echo, and that the second time slot is also assigned by recognizing the "RESERVED" signal. Therefore, the first and second time slots are used successively for fast transferring.

6 Claims, 11 Drawing Sheets

RANDOM ACCESS SYSTEM OF A MOBILE COMMUNICATION SYSTEM

TECHNICAL FIELD

This invention relates to, for example, a random access system of a mobile communication system suitable for accessing common access channels of a TDMA mobile communication system.

BACKGROUND ART

TDMA (Time division multiple access) system, which uses each of time slots into which a frame is partitioned as a traffic channel, is widely used for a digital mobile communication. In this system, a single slot (i.e., the slots having the same number) Generally forms a channel, and each mobile station accesses a base station using the unit of the slot having the same number.

In the case of packet communication, the data transfer rate is higher if a plurality of time slots are used successively. For example, as shown in FIG. 1, in the case that one frame consists of three slots, using two successive time slots for transferring packets will improve the rate drastically (about twice as fast).

Figure 1:
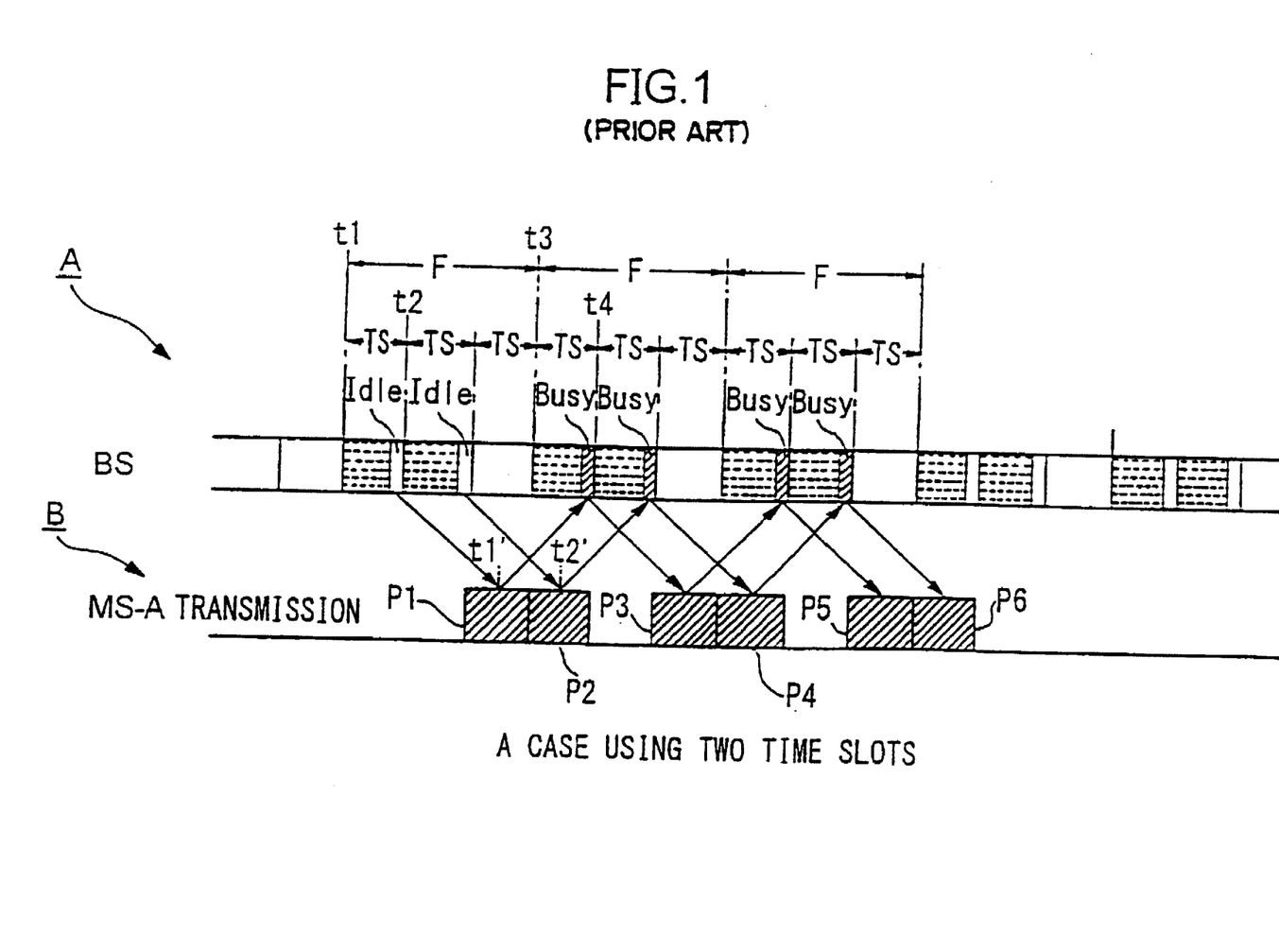
FIG. 1 shows transmitting and receiving sequences of a conventional communication system.

In FIG. 1, (A) shows transmission time slots generated by the base station BS. (B) shows data transmission timing of the mobile station MS-A. The sequence shown in FIG. 1 is based on the frame specified by Personal Digital Cellular Telecommunication System RCR Standard in Japan, RCR STD-27B, and the time slot of the mobile station is shifted by a predetermined time interval with respect to the transmission time slot of the base station. The receiving time slots of the base station BS (i.e., the slot synchronizing to the transmission timing of the mobile station) are not shown in this figure for simplicity. The transmitting and receiving sequences which appear in the following explanations are also based on the same standard as in FIG. 1.

In the state shown in FIG. 1, all time slots TS in the frame F beginning at time t1 are in idle states. At the final portion of the first time slot TS within this time frame, data "IDLE", which shows that the time slot TS is idle, is transmitted. The mobile station MS-A, which received this data "IDLE", transmits packet data P1 at time t1' in the time slot TS which is shifted by a pre-determined time interval. Similarly, at the final portion of the second time slot TS which begins at time t2, data "IDLE" is transmitted from the base station BS. The mobile station MS-A, which received this data "IDLE", transmits packet data P2 at time t2' which is shifted by a pre-determined time interval.

The base station BS which received packets P1 and P2 generates, in the first time slot TS beginning at time t3, a "BUSY" signal which corresponds to the reception of packet P1, and generates, in the second time slot TS beginning at time t4, another "BUSY" signal which corresponds to the reception of packet P2. As a result, other mobile stations stop transmitting their data in response to the reception of the "BUSY" signal and avoid telecommunication collisions. The mobile station MS-A whose transmission channel has been assigned recognizes the establishment of a communication with the base station BS by receiving the "BUSY" signal showing the communication with the station MS-A itself, and then generates the next generative packets P3 and P4 successively. The "BUSY" signals which correspond to the reception of packets P3 and P4 are generated from the base station BS in the first and second time slots TS of the next frame which is shifted by a pre-determined time interval. Then the mobile station MS-A transmits packets P5 and P6 by the same procedure.

Figure 2:
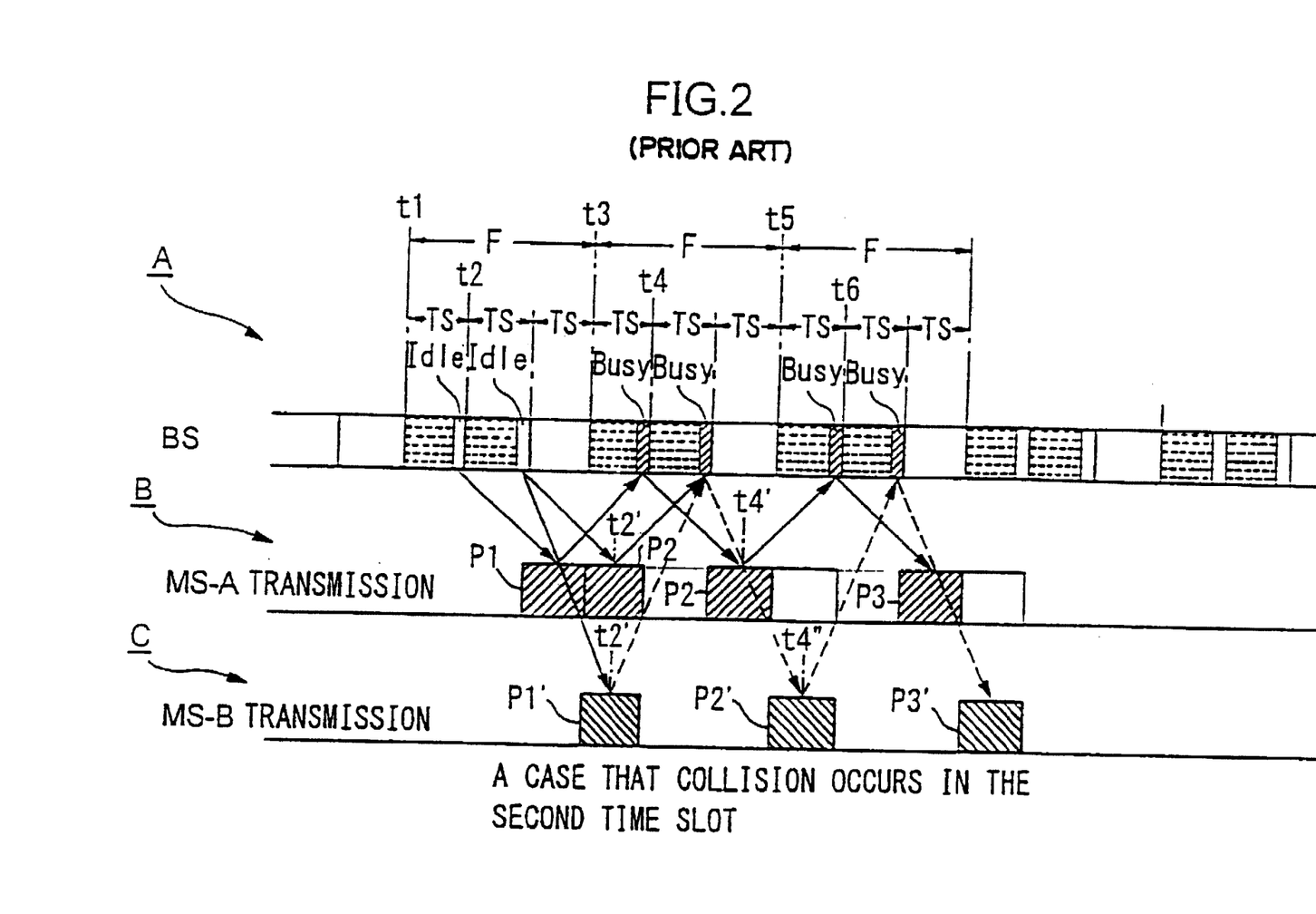
FIG. 2 shows transmitting and receiving sequences in the case that transferring signals from two mobile stations collide in the conventional communication system.

In the following a case of a communication collision from two mobile stations is explained. Referring to FIG. 2, (A) shows the time slots generated by the base station BS. (B) and (C) show the transmission timings for mobile stations MS-A and MS-B respectively.

The mobile station MS-A in this figure requests to transmit packets by using two successive time slots as in the case of FIG. 1. The first packet P1 has been received by the base station BS on the same timing as FIG. 1. In this figure, the mobile station MS-B generates a transmission request, at the same time t2' as the mobile station MS-A transmits packet P2. The base station BS, after receiving the transmitting signal from the mobile station MS-B, generates a "BUSY" signal which shows the establishment of a communication with the mobile station MS-B, at the final portion of the slot TS beginning at time t4. As a result, the mobile station MS-A, knowing that packet P2 is not received, makes a re-transmission by using the first time slot in which the communication has been already secured. Namely, the mobile station MS-A receives the "BUSY" signal which shows the communication failure with station MS-A at the final portion of the time slot TS beginning at time t4, and re-transmits packet P2 at time t4'. A "BUSY" signal corresponding to packet P2 is generated by the base station BS in the first time slot TS in the frame F which begins at time t5.

On the other hand, the mobile station MS-B receives, at the final portion of the time slot TS beginning at time t4, the "BUSY" signal which shows the establishment of a communication with the mobile station MS-B, and transmits the next packet P2' at time t4" which is shifted by a pre-determined time interval. The base station BS, which received the packet P2', generates a "BUSY" signal in the second time slot TS in the frame which begins at time t5. In the manner described above, the first time slot in the receiving frame (not shown) at the base station BS is used by the mobile station MS-A, and the second time slot is used by the mobile station MS-B. Here, as clearly understood by the transferring state shown in (B) in FIG. 2, the mobile station MS-A tried to transmit packets by using two successive time slots, however only one time slot was used in the state shown in FIG. 2. Thus, the desired transferring rate was not achieved.

As described above, in a conventional random access system, there is a disadvantage that even when more than two time slots are used in order to shorten the transferring period, there is a possibility of a collision of the packets after the first packet in the existence of two competing mobile stations. Therefore desired transferring rate is not guaranteed due to the reduction of the transferring efficiency of the radio channel and possible shortening of the number of time slots available.

DISCLOSURE OF INVENTION

In view of the foregoing, it is an object of the present invention to provide a random access system which is capable of giving priority to assign the required number of slots, thus avoiding deterioration of efficiency of the radio channel due to the collision, and therefore shortening the transferring period when using a plurality of time slots in transferring.

In order to achieve the above mentioned object, a first aspect of the present invention provides a random access system for mobile communication which includes a base station and first and second mobile stations which access a TDMA common access channel generated by the base station, wherein the base station has means for detecting "IDLE", "BUSY", and "RESERVED" states of each time slot of the common access channel, means for broadcasting a detected state to a communication area of the base station, means for permitting Communication with the first mobile station and setting time slot A to the "BUSY" state when the first mobile station accesses the time slot A which is in the "IDLE" state, and means for setting time slot B to the "RESERVED" state when the first mobile station requires the time slot B successively, the first mobile station has means for using a time slot having an identical number with a number of a recognized time slot in a case that the first mobile station recognizes the time slot which is in the "BUSY" or "RESERVED" state for the first mobile station, and the second mobile station has means for postponing signal transfer until the "IDLE" state is broadcasted in a case that the time slot is in the "BUSY" or "RESERVED" state for the first mobile station.

Here, the time slot A is an arbitrary time slot which is in the "IDLE" state, and said time slot B is an arbitrary time slot other than said time slot A.

According to a second aspect of the present invention there is provided a random access system for mobile communication which includes a base station and first and second mobile stations which access a TDMA common access channel generated by the base station, wherein the base station has means for detecting "IDLE", "BUSY", and "RESERVED" states of each time slot of the common access channel, means for broadcasting a detected state to a communication area of the base station, means for permitting communication with the first mobile station and setting time slot A to the "BUSY" state when the first mobile station accesses the time slot A which is in the "IDLE" state, and means for setting time slot B to the "RESERVED" state when the first mobile station requires the time slot B successively, and means for accepting an access from said second mobile station in said time slot B, when transfer from said second mobile station ends by said access from said second mobile station, the first mobile station has means for using a time slot having an identical number with a number of a recognized time slot in a case that the first mobile station recognizes the time slot which is in the "BUSY" or "RESERVED" state for the first mobile station, and the second mobile station has means for postponing signal transfer until the "IDLE" state is broadcasted in a case that the time slot is in the "BUSY" or "RESERVED" state for the first mobile station.

According to a third aspect of the present invention there is provided a random access system for mobile communication which includes a base station and first and second mobile stations which access a TDMA common access channel generated by the base station, wherein the base station has means for detecting "IDLE", "BUSY", and "RESERVED" states of each time slot of the common access channel, means for broadcasting detected state to a communication area of the base station, means for permitting communication with the first mobile station and setting time slot A to the "BUSY" state when the first mobile station accesses the time slot A which is in the "IDLE" state, means for setting time slot B to the "RESERVED" state when the first mobile station requires the time slot B successively, and means for accepting an access from the second mobile station in the time slot B, when transfer from the second mobile station ends by the access from the second mobile station, the first mobile station has means for using a time slot having an identical number with a number of a recognized time slot in a case that the first mobile station recognizes the time slot which is in the "BUSY" or "RESERVED" state for the first mobile station, and the second mobile station has means for postponing signal transfer until the "IDLE" state is broadcasted in a case that the time slot is in the "BUSY" or "RESERVED" state for the first mobile station.

According to a fourth aspect of the present invention there is provided a random access system for mobile communication which includes a base station and first and second mobile stations which access a TDMA common access channel generated by the base station, wherein the base station has means for detecting "IDLE", "BUSY", and "RESERVED" states of each time slot of the common access channel, means for broadcasting detected state to a communication area of the base station, means for permitting communication with the first mobile station and setting a time slot to the "BUSY" state when the first mobile station accesses the time slot which is in the "IDLE" state, means for setting a later time slot to the "RESERVED" state when the first mobile station requires the later time slot successively, and means for accepting an access from the second mobile station in the later time slot and setting the later time slot to the "BUSY" state, the first mobile station has means for using a time slot having an identical number with a number of a recognized time slot in a case that the first mobile station recognizes the time slot which is in the "BUSY" or "RESERVED" state for the first mobile station, and the second mobile station has means for postponing signal transfer until the "IDLE" state is broadcasted in a case that the time slot is in the "BUSY" or "RESERVED" state for the first mobile station.

According to the above mentioned aspects of the present invention, it is possible to give priority to assign the required number of time slots, and thus to shorten the transferring period when using a plurality of time slots in transferring.

BEST MODE FOR CARRYING OUT THE INVENTION (1) First embodiment

1. A case using two time slots

Figure 3:
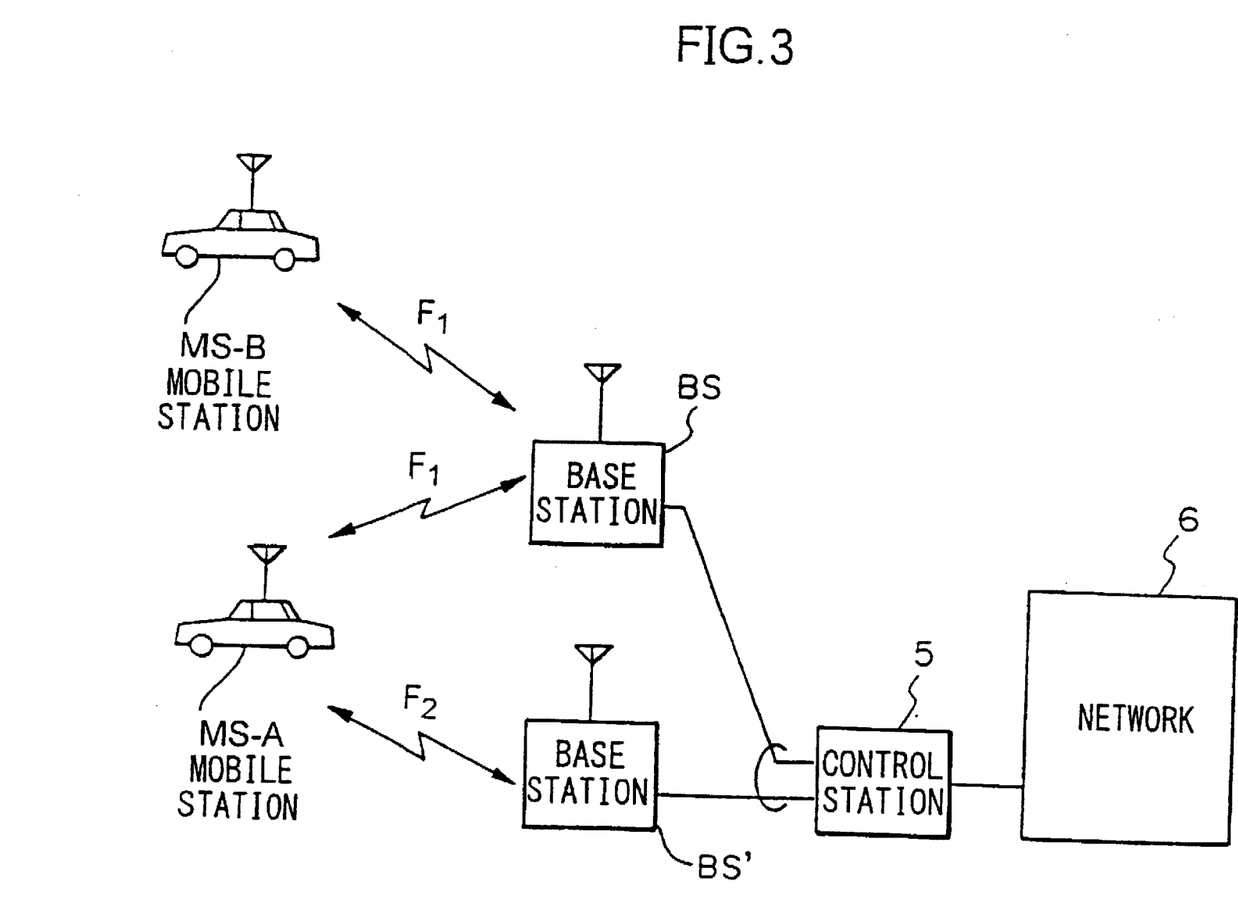
FIG. 3 is a block diagram schematically showing a mobile communication system to which the present invention is applied.

FIG. 3 is a block diagram schematically showing a mobile communication system to which the present invention is applied. The mobile stations MS-A and MS-B access the base station BS by using a carrier of frequency F1 (uplink). These accesses are random accesses of TDMA system as in the case shown in FIGS. 1 and 2.

When the mobile station MS-A moves into the adjacent cell, the base station BS' is accessed by using a carrier of frequency F2 (upward). A control station 5 controls the base stations BS and BS' and properly connects the base stations BS and BS' to a network 6.

Figure 4:
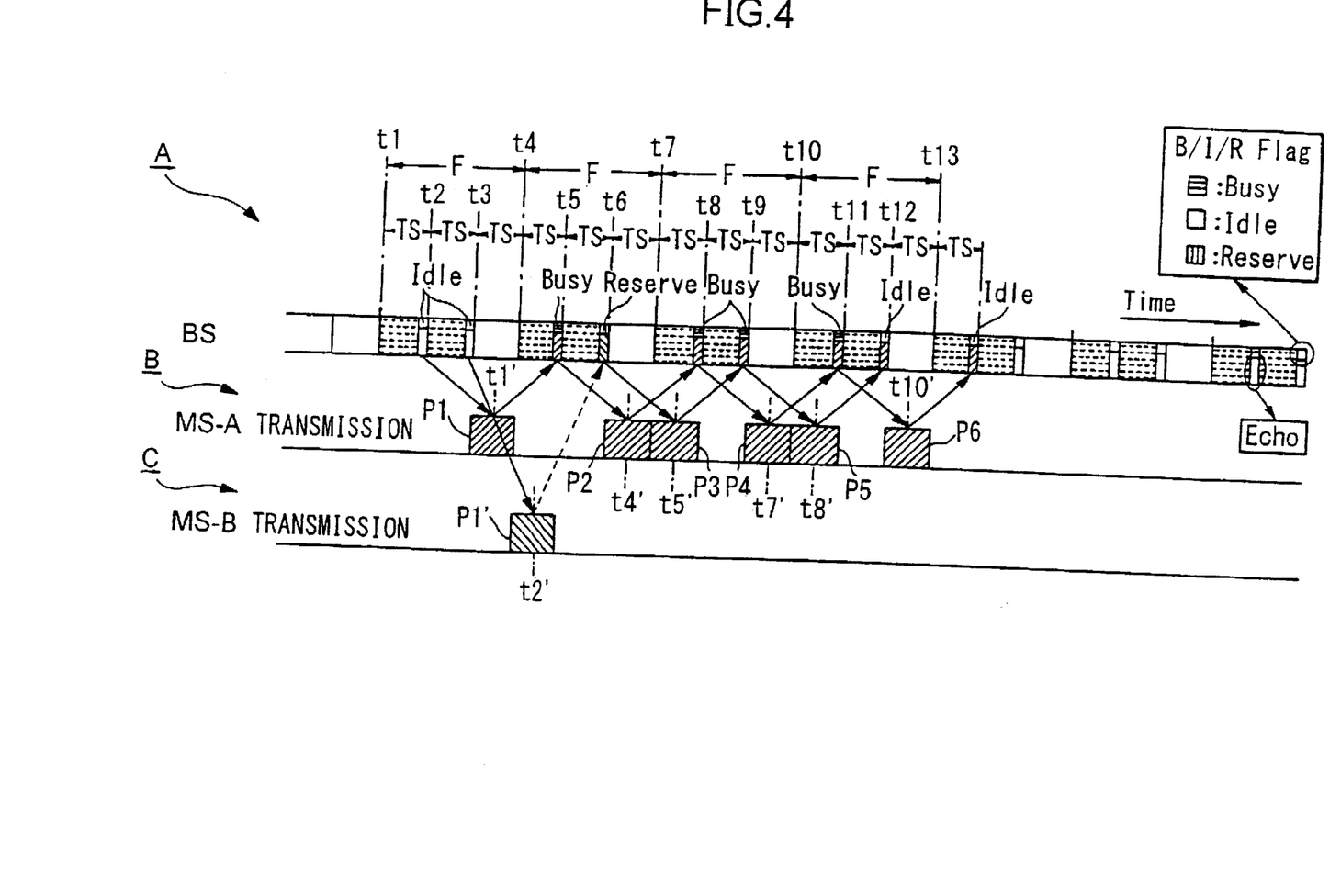
FIG. 4 shows transmitting and receiving sequences of the communication system according to the first embodiment of the present invention.

Referring to FIG. 4, a random access system according to the first embodiment will be described. In FIG. 4, the base station BS broadcasts a B/I/R flap and an echo ("Echo") to an area thereof, at the final portion of each time slot TS. Here, a B/I/R flag is constructed by one of three kinds of signals, "BUSY", "IDLE", and "RESERVED" As previously mentioned (refer to FIGS. 1 and 2), the "BUSY" and "IDLE" signals show "BUSY" and "IDLE" states of a time slot respectively. The "RESERVED" signal, which is newly introduced by the present invention, shows that the time slot is reserved by one of the mobile stations.

Now, the "IDLE" signal is generated at the final portion of time slot TS which begins at time t1, and the mobile station MS-A, after recognizing this signal, transfers packet P1 at time t1' The base station BS receives this packet P1 and generates a "BUSY" signal and an echo at the final portion of the first time slot TS which begins at time t4. Also, the mobile station MS-A generates data which show the number of transferring packets in the header of packet P1. Then, the base station BS recognizes that there are packets following packet P1 and reserves the next time slot for the mobile station MS-A, if the time slot is available. In this case, the next time slot, i.e., the second time slot is reserved for the mobile station MS-A.

On the other hand, an "IDLE" signal is also generated at the final portion of time slot TS which begins at time t2. In the case shown in the figure, the mobile station MS-B, which recognized this signal, transfers packet P1' at time t2'. The base station BS accepts this packet P1' if the packet P1' is the only packet or the final packet. After accepting packet P1' at time t2', the base station BS generates a "RESERVED" signal for the mobile station MS-A at the final portion of the second time slot TS which begins at time t5.

The information of whether or not packet P1' is either only or final packet is transferred in the header of the packet P1'. However, if it is the final packet of continuous packets, data showing the number of packets are transferred in the header of the first packet, and accordingly the base station BS learns that packet P1' is the final packet.

At the final portion of time slot TS beginning at time t4, a "BUSY" signal which is due to communication with the mobile station MS-A is generated. The mobile station MS-A, recognizing this "BUSY" signal and the echo thereof, learns that the first time slot TS is secured as a channel available to the station MS-A. At time t4', the mobile station MS-A transfers the next signal, packet P2. The packet P2 is received by the base station BS at transferring time (time t4'), and a "BUSY" signal is generated from the base station BS in the time slot TS which begins at time t7.

The mobile station MS-A recognizes the "RESERVED" signal at the final portion of the time slot TS which begins at time and learns that the second time slot is also secured as its channel. In this case, the echo belongs to the mobile station MS-B. When a "RESERVED" signal is generated in the next time slot to the one in which the echo of the station MS-A is recognized, the "RESERVED" signal is recognized as the reservation for the station MS-A. Therefore, at time t5', the mobile station MS-A transfers packet P3 which is the signal to be transferred next. The base station BS, after receiving this packet P3, transmits a "BUSY" signal at the final portion of the second time slot TS which begins at time t8. In the manner mentioned above, the mobile station MS-A can use the first and second time slots TS of each frame, and accordingly can execute fast transferring using the two time slots.

In this case, accesses by other stations are forbidden because of the "RESERVED" signal generated in the second time slot which begins at time t5, and thus the second time slot is certainly accessed by the mobile station MS-A. Therefore, the mobile station MS-A can certainly execute the signal transfer using the two time slots and the transferring rate is guaranteed.

In the second time slot TS which begins at time t11, the base station BS recognizes that this is the last packet to be received in the second time slot, by the number of the packets to be transferred from the mobile station MS-A, generates an "IDLE" signal at the final portion of the slot, and allows other mobile stations to access the base station. In the same manner, in the first time slot TS which begins at time t13, the base station BS generates an "IDLE" signal at the final portion of the slot and allows other mobile stations to access the base station.

2. A case using three time slots

Figure 5:
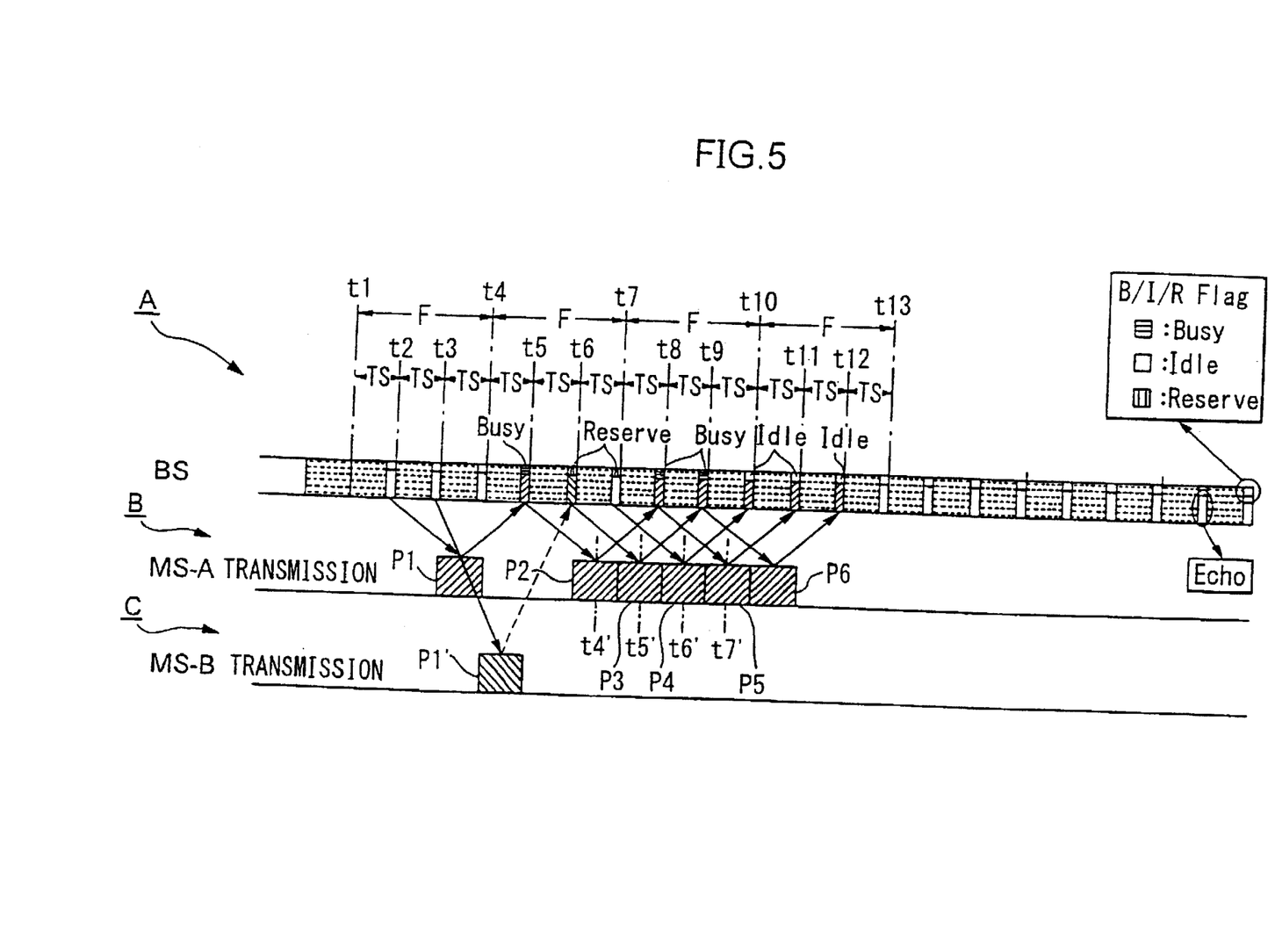
FIG. 5 shows transmitting and receiving sequences in the case of using three time slots according to the first embodiment.

The above mentioned case uses two time slots in signal transfer. However, it is also possible to use three time slots in this embodiment. FIG. 5 shows transferring and receiving sequences in this case.

The base station BS, receiving packet P1 in the first time slot in a receiving frame, generates a "BUSY" signal at the final portion of the first time slot of transmitting frame which begins at time t4. Since the mobile station MS-A transmits data which show the number of packets to be transferred in the header of packet P1, the base station BS recognizes that there should be other packets following packet P1. In this case, since the mobile station MS-A transfers packets by using the first to third time slots, the base station BS makes sure that the second and third time slots TS, which are the next receiving time slots, should be "RESERVED" states. The "RESERVED" signal is generated at the final portions of the second and third time slots which begin at times t5 and t6 respectively, and accesses from other mobile stations are prohibited in the next frame.

However, when the mobile station MS-B transfers packet P1' which is the only or the final packet in the timing shown in (C) of FIG. 5, this packet P1' is accepted even in the "RESERVED" time slot in the same manner mentioned above.

Next, the mobile station MS-A receives the "BUSY" signal which is due to the station MS-A itself at the final portion of time slot TS beginning at time t4 and the "RESERVED" signals following the "BUSY" signal at the final portions of time slots TS beginning at times t5 and t6. As a consequence, the mobile station MS-A transfers three packets P2, P3, and P4 at times t4', t5', and t6' successively. The base station which receives those packets is to generate "BUSY" signals in time slots which begin at times t7, t8, and t9. In this manner, the mobile station MS-A can conduct fast transferring by using three time slots successively.

However, in time slots TS which begin at times t9, t10, and t11, the base station BS knows that the packets are the last of the third, first, and second time slots respectively. Therefore, the base station BS generates "IDLE" signals at the final portions of those slots, allowing other mobile stations to access in the next frame.

(2) Second embodiment

Figure 6:
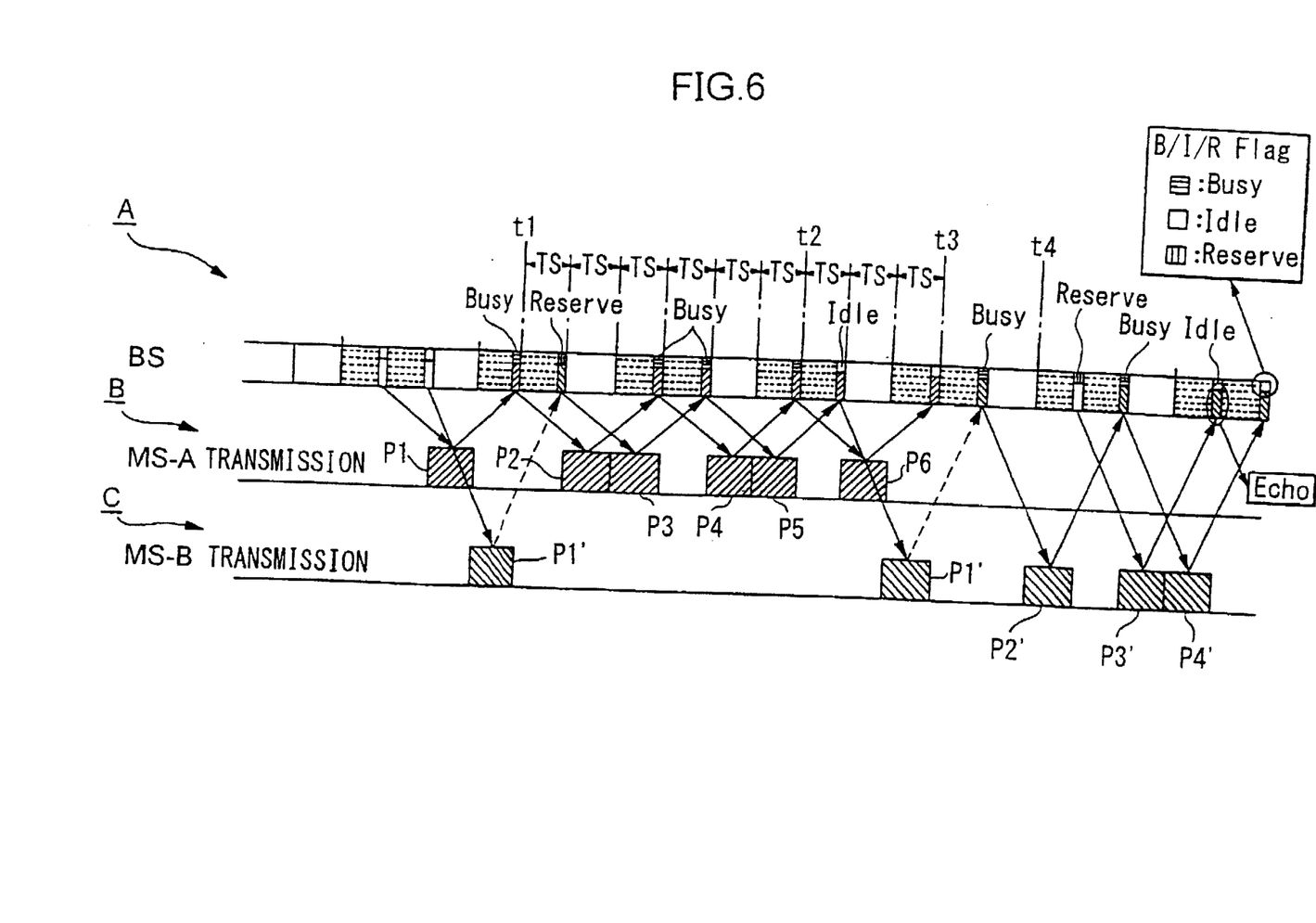
FIG. 6 shows transmitting and receiving sequences of the communication system according to the second embodiment of the present invention.

Next, a second embodiment of the present invention will be explained. Since the second embodiment is basically the same as the first embodiment, only the differences will be described. As shown in FIG. 6, the transmitting time slot TS beginning at time t1 shows a reservation for the mobile station MS-A. In the first embodiment, when the mobile station MS-B accesses the reserved time slot, under a certain condition (in the case that packet P1' is the only or final packet), the transferred signal was accepted. In this second embodiment, however, the transferred signal is not accepted even in that condition, and a re-transmission is requested to the mobile station MS-B.

As a consequence, the mobile station MS-A transfers signals as in the case shown in FIG. 4. However, the mobile station MS-B begins re-transfer only after recognizing an "IDLE" signal generated in time slot TS beginning at time t2. The base station BS receives the transferred signal at this time, and as a result, a "BUSY" signal is generated in the second time slot TS which begins at time t3. In this case, the base station BS, in the same manner as the first embodiment, learns that the mobile station MS-B is requesting multiple packets transfer, reserves the next receiving time slot, and generates a "RESERVED" signal in the first time slot TS which begins at time t4.

As described above, in the second embodiment, signals of the mobile station MS-B are not received in the "RESERVED" time slot, but are accepted continuously only after finishing communication with the mobile station MS-A. Therefore, the signal transfer of the mobile station MS-B is conducted continuously from the first to final packet without any interruption.

Figure 7:
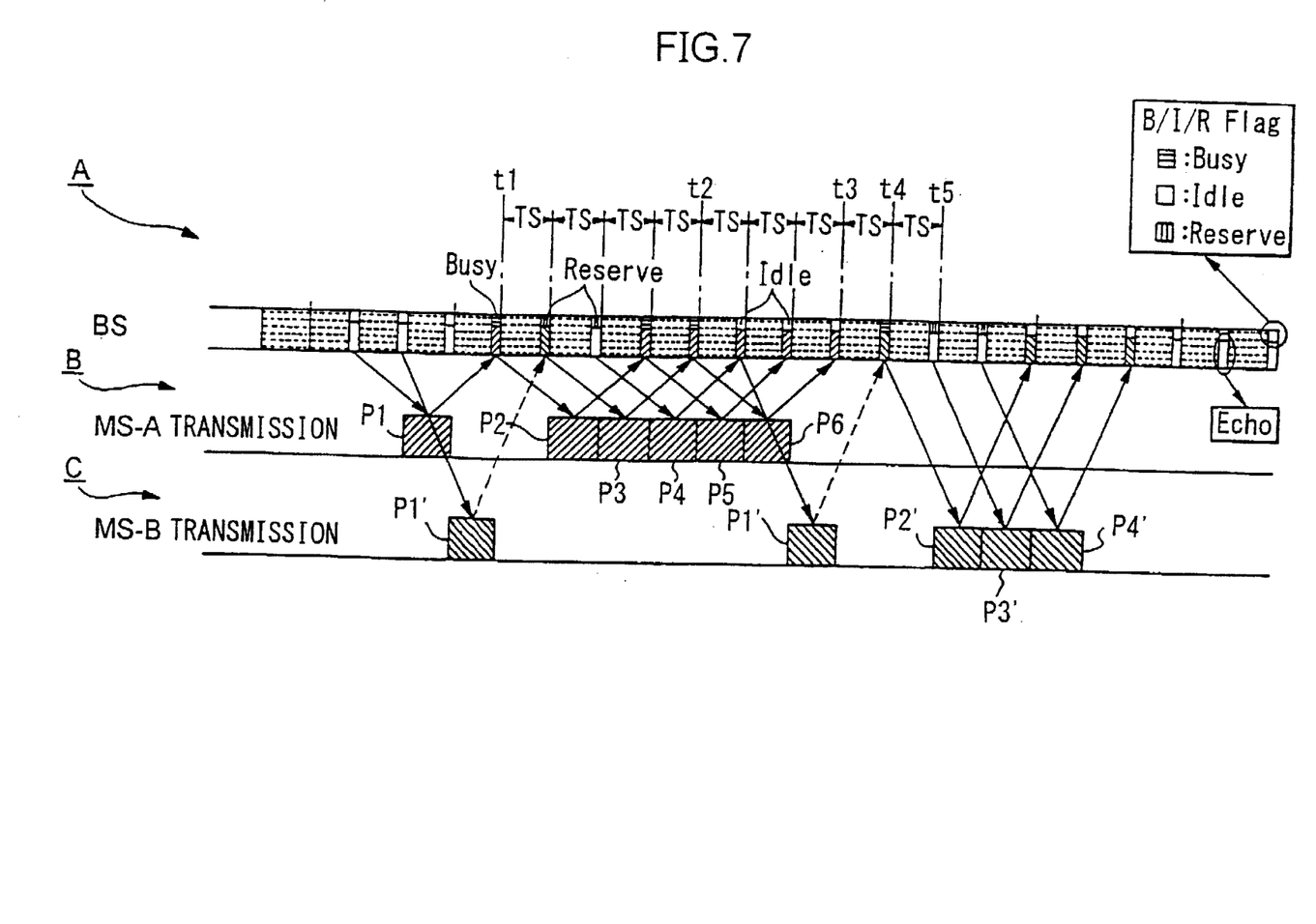
FIG. 7 shows transmitting and receiving sequences in the case of using three time slots according to the second embodiment.

FIG. 7 shows a transferring sequence in the case of using three time slots in transferring. This sequence is also similar to the above mentioned sequence using two slots; packet P1' is not accepted in receiving time slot of the base station BS when the mobile station MS-B generates the packet P1' for the first time, and a "RESERVED" signal for the mobile station MS-A is generated in time slot which begins at time t1. Therefore, the mobile station MS-B starts packet transfer after receiving an "IDLE" signal generated in time slot TS which begins at time t2.

(3) Third embodiment

Figure 8:
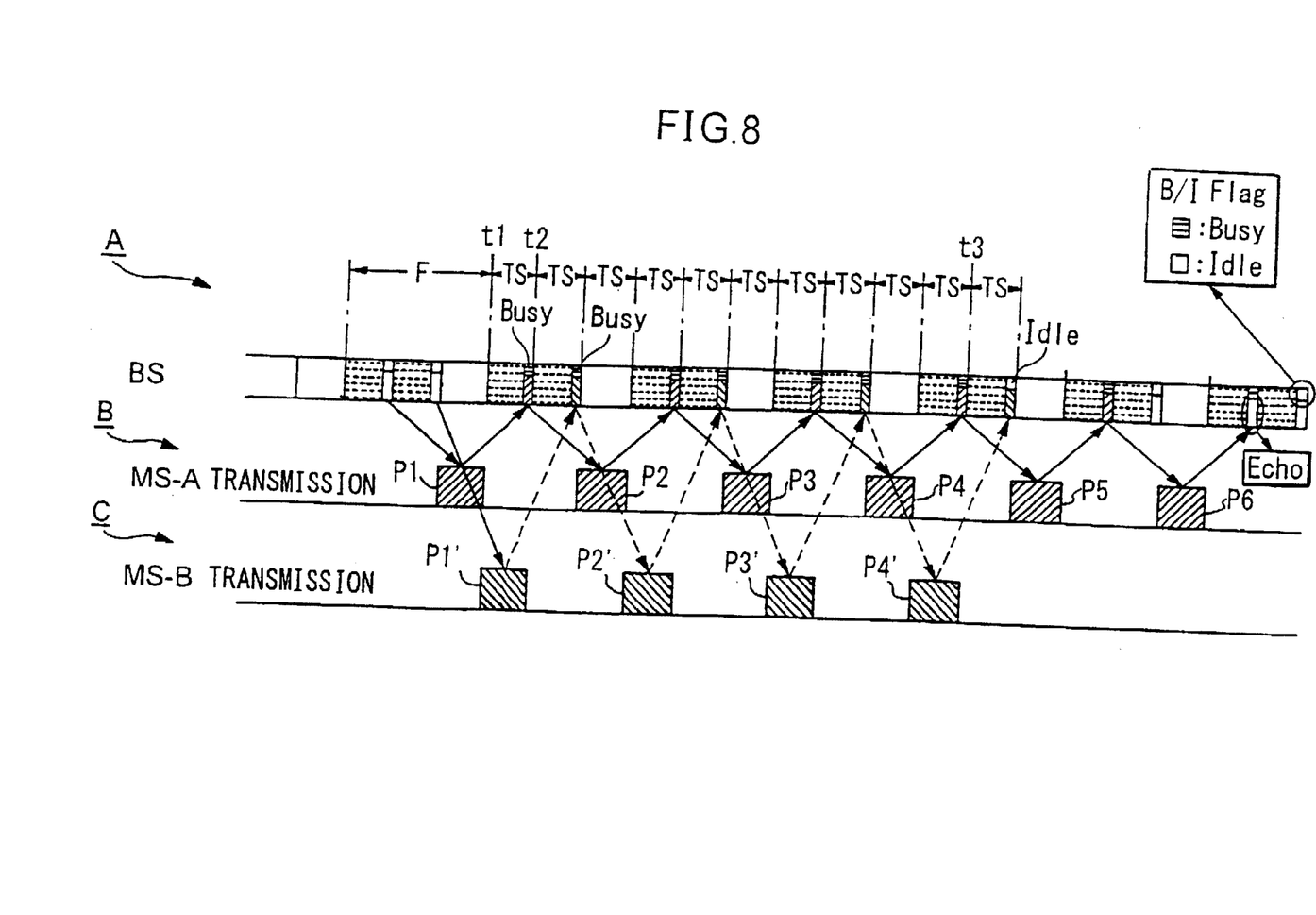
FIG. 8 shows transmitting and receiving sequences of the communication system according to the third embodiment of the present invention.

Referring to FIG. 8, the third embodiment of the present invention will be described. While this embodiment is also similar to the first embodiment, there are differences such that, when a "RESERVED" time slot is accessed by another mobile station, reservation is canceled, the signal of the newly accessing the mobile station is accepted, and the "BUSY" signal for the time slots is generated.

For example, as shown in FIG. 8, since the mobile station MS-A has a plurality of packets to be transferred, the next time slot TS is "RESERVED" for the mobile station MS-A. When there is no access from other mobile stations in this "RESERVED" time slot, the "RESERVED" signal is generated in the transmitting time slot as it is, and secures the use of the mobile station MS-A. The sequence in this case is similar to that in the previously mentioned first embodiment. However, for example, when the mobile station MS-B accesses in "RESERVED" time slot, the base station BS accepts this and generates a "BUSY" signal at the final portion of transmitting time slot TS corresponding to the accepted time slot. As a result, the second time slot is used by the mobile station MS-B hereafter, and accordingly mobile stations MS-A and MS-B transfer packets alternately.

In this embodiment, the base station BS generates an "IDLE" signal at the final portion of transmitting time slot TS (time slot which begins at time t3) corresponding to the time slot which accepted the final packet of the mobile station MS-B. Nevertheless, the mobile station MS-A keeps the former time interval of signal transmission and continues transferring until the last packet.

Figure 9:
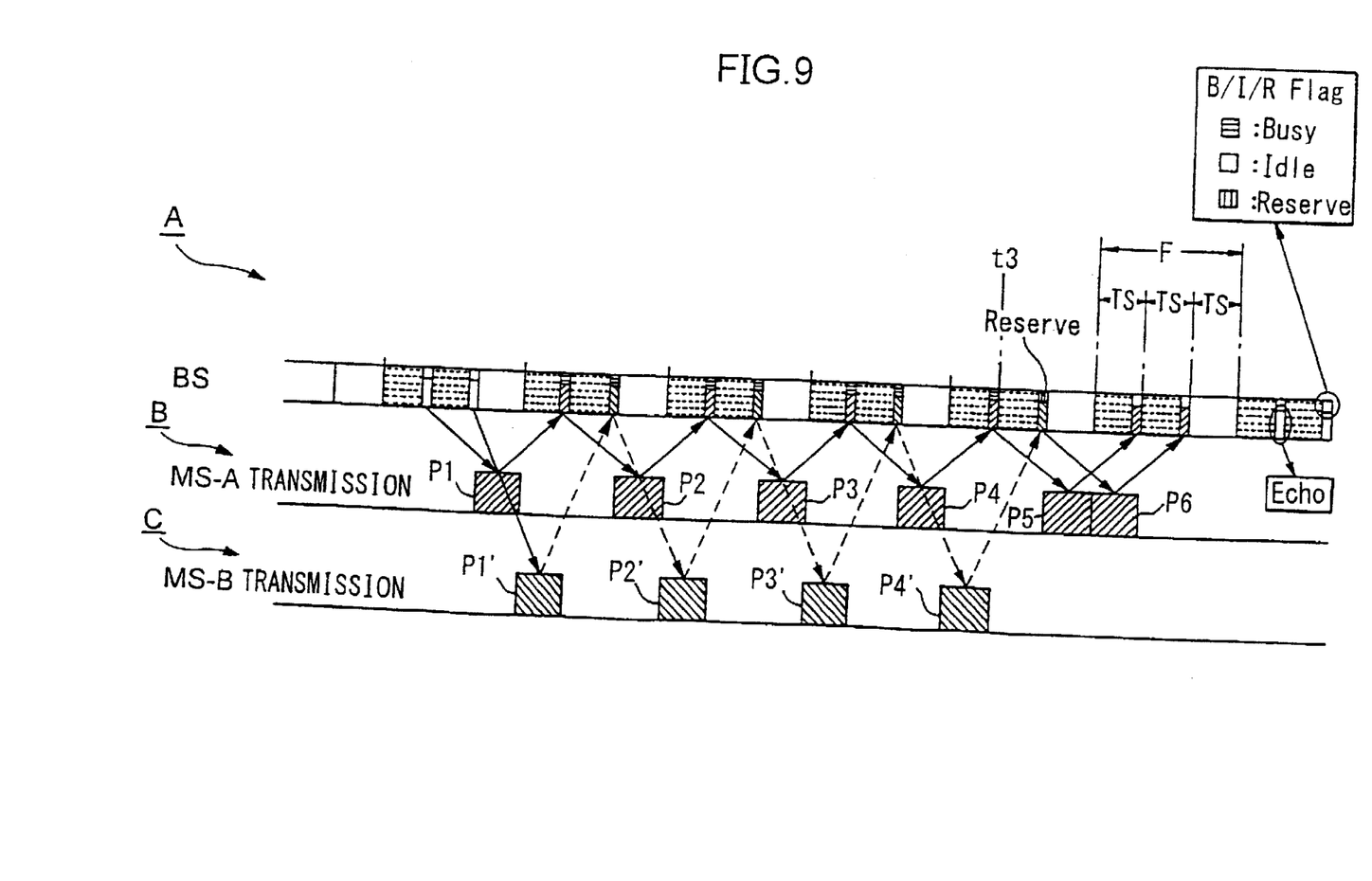
FIG. 9 shows transmitting and receiving sequences according to a modified third embodiment.

It is possible, however, as shown in FIG. 9, to transmit a "RESERVED" signal at the final portion of transmitting time slot corresponding to the time slot which accepted the last packet of the mobile station MS-B, and to give the mobile station MS-A priority to use the second time slot TS of the next frame.

As described above, in this embodiment, if there is no access from other mobile stations in the "RESERVED" time slot, priority is given to the mobile station MS-A which accessed by the same way as in the first embodiment. While when there is an access from another mobile station in the "RESERVED" time slot, the access is accepted and both stations communicate alternately.

Therefore, as shown in FIG. 8, in the case that the mobile station MS-A tries signal transfer using two time slots and that another mobile station accesses a "RESERVED" time slot, there is no significant difference in the transferring rate from the conventional system (refer to FIG. 1). However, when a mobile station transfers signals using more than or equal to three time slots, the mobile station which accesses first has an advantage in transferring rate.

Figure 10:
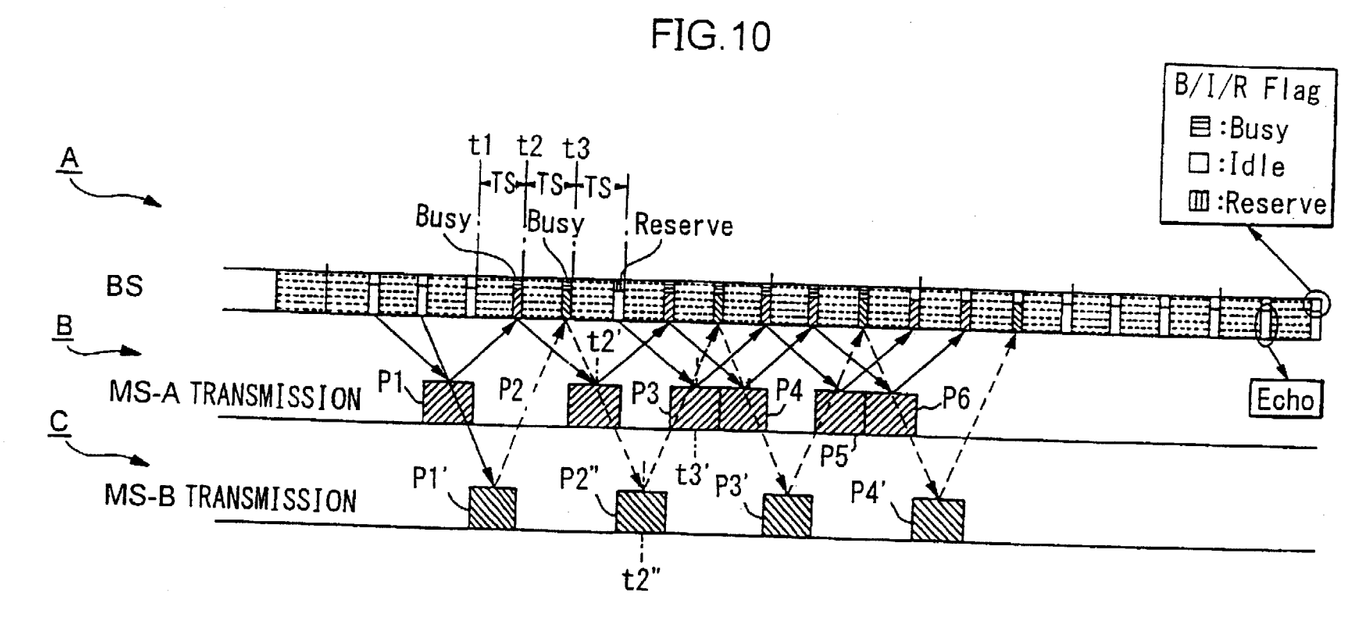
FIG. 10 shows transmitting and receiving sequences in the case of using three time slots according to the third embodiment.

This point will be explained as follows. As shown in FIG. 10, the base station DS which accepted the signal from the mobile station MS-A generates a "BUSY" signal in time slot TS which begins at time t1, and sets the states of the two successive time slots to "RESERVED" states. On the other hand, when the mobile station MS-B generates packet P1' immediately after the mobile station MS-A transfers packet P1, the packet P1' is accepted by the base station BS. Accordingly the base station BS generates "BUSY" signal at the final portion of transmitting time slot TS (time slot which begins at time t2) corresponding to the accepted time slot.

As a consequence, the mobile station MS-A, at the final portions of time slots TS which begin at times t2 and t3, recognizes "BUSY" and "RESERVED" signals respectively. As a result, the mobile station MS-A transfers the next packets P2 and P3 at times t2' and t3' respectively. On the other hand, the mobile station MS-B receives, at the final portion of the time slot beginning at time t2, the "BUSY" signal and an echo of the station MS-B itself. Accordingly the base station MS-B recognizes that the second time slot is assigned and transfers the next packet P2' at time t2".

As a result, the mobile station MS-A transfers signals using the first and third slots, and the mobile station MS-B transfers signals using the second time slot. Therefore, the mobile station MS-A has a transferring rate twice as fast as that of the mobile station MS-B.

(4) Modified embodiment

The present invention is not limited to the above mentioned embodiments. For example, various modifications can be applied as described below.

1. In the embodiments described above, each mobile station determines, whether or not a "BUSY" signal depends on communication of the mobile station itself, by receiving the echo. However, this can be determined by using signals other than the echo. For example, codes which identify the mobile station can be used to determine this.

2. Although the number of the time slots used in the above mentioned embodiments was two or three, the scope of the present invention is not limited to those cases, and any number of time slots can be used.

3. In a random access system, when transmission request of a mobile station is not accepted, the mobile station generates the transmission request again. In this occasion, two kinds of systems can be considered. In one system, the transmission request is repeatedly generated to the channel the first transmission request was done. In another system, idle channels are actively searched and the transmission request is generated to the idle channel. While the former system was adopted in the above mentioned embodiments, the latter system can be also adopted.

The former system is suitable for the case that data quantity of single communication is small since the waiting time is relatively short in this case. On the other hand, the search takes time in the latter system since it is necessary to have steps such as the frequency conversion of a synthesizer. However, when data quantity of single communication is large, the time spent for the search is shorter than the waiting time of the former system. Therefore, which system to use can be decided in compliance with the average communication period per one event.

4. In a system mentioned in the above embodiment, in which a transmission request is repeatedly generated to the channel on which the first transmission request was done, a random delay system can be adopted. Namely, by randomly distributing the time periods from the time when the transmission request is denied to the time when the transmission request is generated again among mobile stations, the concentration of many transmission requests to one "IDLE" channel can be avoided.

5. The system in which more than one time slots are assigned to a single mobile station is not limited to the one in the above mentioned embodiments, and other various systems can be applied. One example will be described referring to FIG. 11.

Figure 11:
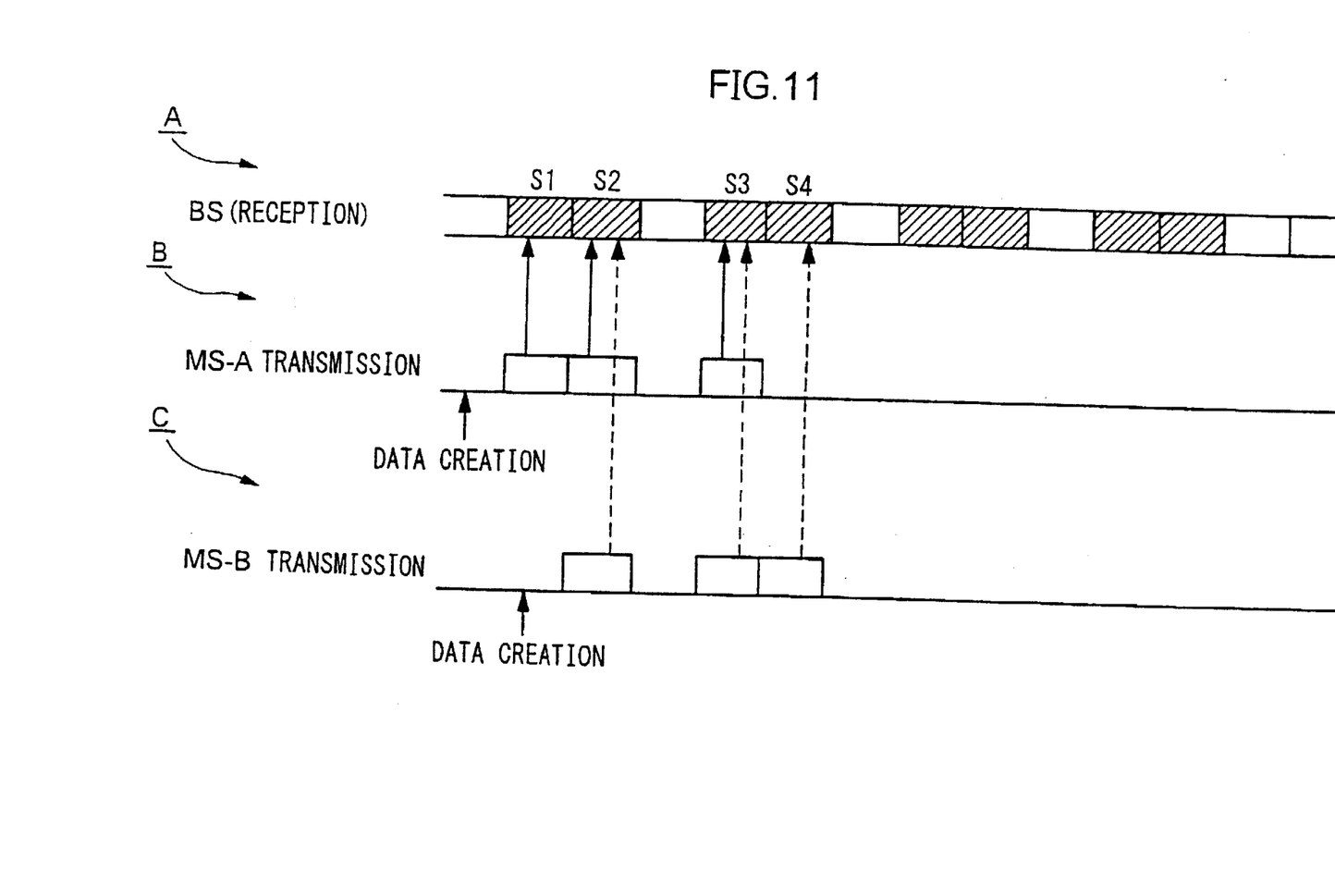
FIG. 11 shows transmitting and receiving sequences according to another modified third embodiment.

In the system of this modified example, idle or busy states of slots are not notified to mobile stations MS-A nor MS-B. In mobile stations MS-A and MS-B, when transmission data are generated, these data are transmitted to the base station BS at the time when the transmission is possible. In this case, a plurality of slots of a single frame are used. In this system, since the base station BS does not control idle channels, the transmission data of the mobile station MS-A and MS-B often collides with each other. In the case of the collision the behavior varies depending on reception field levels at the base station BS. Namely, when the reception field level of one of the mobile stations MS-A and MS-B is considerably higher than that of the other, the data having the higher level is received by the base station BS.

On the other hand, when the difference of the reception field level is small, neither of the data are received. It is preferable that when the base station BS receives data from one of the mobile stations, the base station BS responds to the reception of the data of the mobile station.

6. In the above mentioned embodiments, it was necessary for mobile stations MS-A and MS-B to transmit the number of units (the number of packets) which are to be transmitted.

However, it is also possible that mobile stations MS-A and MS-B transfer, in the time slot just before the last one, a last unit notification signal which notifies that the last unit is transferred, and that the base station BS, in the case of receiving the last unit notification signal, sets the time slot in which the last unit is received to an "IDLE" state. In this manner, the data transmission can be started, even when the total number of units are unknown.

We claim:

1. A random access system for mobile communication comprising a base station and first and second mobile stations which access a TDMA common access channel generated by said base station, wherein:

said base station has means for detecting "IDLE", "BUSY", and "RESERVED" states of each time slot of said common access channel, means for broadcasting detected state to a communication area of said base station, means for permitting communication with said first mobile station and setting time slot A to said "BUSY" state when said first mobile station accesses said time slot A which is in said "IDLE" state, and means for setting time slot B to said "RESERVED" state when said first mobile station requires said time slot B successively;

said first mobile station has means for using a time slot having an identical number with a number of a recognized time slot in a case that said first mobile station recognizes said time slot which is in said "BUSY" or "RESERVED" state for said first mobile station; and said second mobile station has means for postponing signal transfer until said "IDLE" state is broadcasted in a case that said time slot is in said "BUSY" or "RESERVED" state for said first mobile station.

2. A random access system for mobile communication comprising a base station and first and second mobile stations which access a TDMA common access channel generated by said base station, wherein:

said base station has means for detecting "IDLE", "BUSY", and "RESERVED" states of each time slot of said common access channel, means for broadcasting detected state to a communication area of said base station, means for permitting communication with said first mobile station and setting time slot A to said "BUSY" state when said first mobile station accesses said time slot A which is in said "IDLE" state, means for setting time slot B to said "RESERVED" state when said first mobile station requires said time slot B successively, and means for accepting an access from said second mobile station in said time slot B, when transfer from said second mobile station ends by said access from said second mobile station;

said first mobile station has means for using a time slot having an identical number with a number of a recognized time slot in a case that said first mobile station recognizes said time slot which is in said "BUSY" or "RESERVED" state for said first mobile station; and said second mobile station has means for postponing signal transfer until said "IDLE" state is broadcasted in a case that said time slot is in said "BUSY" or "RESERVED" state for said first mobile station.

3. A random access system for mobile communication comprising a base station and first and second mobile stations which access a TDMA common access channel generated by said base station, wherein:

said base station has means for detecting "IDLE", "BUSY", and "RESERVED" states of each time slot of said common access channel, means for broadcasting detected state to a communication area of said base station, means for permitting communication with said first mobile station and setting a time slot to said "BUSY" state when said first mobile station accesses said time slot which is in said "IDLE" state, means for setting a later time slot to said "RESERVED" state when said first mobile station requires said later time slot successively, and means for accepting an access from said second mobile station in said later time slot and setting said later time slot to said "BUSY" state;

said first mobile station has means for using a time slot having an identical number with a number of a recognized time slot in a case that said first mobile station recognizes said time slot which is in said "BUSY" or "RESERVED" state for said first mobile station; and said second mobile station has means for postponing signal transfer until said "IDLE" state is broadcasted in a case that said time slot is in said "BUSY" or "RESERVED" state for said first mobile station.

4. A random access system as claimed in claim 3, wherein said base station further has means for setting a time slot corresponding to a last unit of said second mobile station to said "RESERVED" state for said first mobile station, when signal transfer of said second mobile station ends and signal transfer of said first mobile station continues after both said first and second mobile station accessed said base station.

5. A random access system as claimed in one of claims 1 to wherein:

said first and second mobile stations further have means for dividing a transferring signal into a plurality of units, means for assigning each of said units to a pre-determined time slot, means for transferring said each unit assigned to said predetermined time slot, and means for transferring data corresponding to a number of units when a first unit is transferred; and said base station further has means for setting a time slot in which a last unit is accepted to said "IDLE" state in case that said base station received data corresponding to said number of said units.

6. A random access system as claimed in one of claims 1 to 4, wherein:

said first and second mobile stations further have means for dividing transferring signal into a plurality of units, means for assigning each of said units to a predetermined time slot, means for transferring said each unit assigned to said predetermined time slot and means for transferring a last unit notification signal which shows that a last unit is about to be transferred, in a previous frame; and said base station has means for setting a time slot in which said last unit is accepted to said "IDLE" state when said base station receives said last unit notification signal.

* * * * *